United States Patent [19]

Iwamura et al.

[11] 4,319,479

[45] Mar. 16, 1982

[54] METHOD AND AN APPARATUS FOR DETECTING LEAKAGE OF COOLING WATER BY MEASURING DISSOLVED CO AMOUNT

[75] Inventors: Tadaaki Iwamura; Toshio Tamiya, both of Chiba, Japan

[73] Assignee: Kawasaki Steel Corporation, Kobe, Japan

[21] Appl. No.: 134,697

[22] Filed: Mar. 27, 1980

[30] Foreign Application Priority Data

Apr. 2, 1979 [JP] Japan ................................. 54/39523

[51] Int. Cl.³ .......................................... G01N 31/08
[52] U.S. Cl. ...................................... 73/19; 73/23.1; 73/40.5 R; 165/11 R
[58] Field of Search ............... 73/19, 23, 23.1, 40.5 R, 73/40.7, 40; 165/11 R

[56] References Cited

U.S. PATENT DOCUMENTS

| | | | |
|---|---|---|---|
| 3,150,516 | 9/1964 | Linnenbom et al. | 73/19 |
| 4,090,179 | 5/1978 | Hirano | 73/40.5 R |
| 4,133,373 | 1/1979 | Slagley et al. | 73/40.5 R |

*Primary Examiner*—Stephen A. Kreitman
*Attorney, Agent, or Firm*—Balogh, Osann, Kramer, Dvorak, Genova & Traub

[57] ABSTRACT

Leakage of cooling water in means for cooling an equipment keeping a large amount of CO gas therein is detected by measuring an amount of CO dissolved in a given amount of discharged cooling water by means of a gas chromatograph. The apparatus for detecting such leakage is characterized by the combination of a sampling device, a metering device for taking up a given amount of the sample water, a degassing tank for separating CO gas and $CO_2$ gas from water, and a gas analyzing device for quantitatively analyzing and recording the amount of CO gas dissolved in the metered sample water.

2 Claims, 5 Drawing Figures x --- Broken Stave

METHOD AND AN APPARATUS FOR DETECTING LEAKAGE OF COOLING WATER BY MEASURING DISSOLVED CO AMOUNT

The present invention relates to a method for detecting leakage of cooling water in which an amount of CO dissolved in the discharged cooling water is measured and the variation thereof is monitored and to an apparatus therefor. Particularly, the present invention carried out a quantitative analysis of an amount of CO dissolved in the discharged cooling water without measuring an amount of CO present as bubbles in said cooling water and aims to early detect even a fine breakage in cooling means by carrying out the measurement having a high reproducibility by using gas chromatograph.

As process for detecting the leakage of cooling water in cooling means in an equipment keeping a large amount of CO gas, for example in tuyere, stave and the like in a blast furnace, a variety of processes have been heretofore proposed in a large number of publications but most of them are only technical ideas and even in practically conducted processes, the detecting peciseness is poor or the operation is complicated and the typical prior processes are as follows.

(1) The detecting is effected by the difference of the flow rate between the inlet side and the outlet side of the cooling water.

(2) The detecting is effected by the variation of difference of pressure or temperature of the colling water at the inlet side and the outlet side, occurrence of abnormal noise in the cooling water, variation of height of water column when the supply of water is stopped in a water tube opening to air, which is provided at the water feeding side of stave, relation of an amount of vapor generated to an amount of water supplied in stave, provision of a specific sensor in which electric conductivity varies owing to the wetness or variation of concentration of a non-vaporizing substance, such as NaOH in the cooling water.

(3) The detecting is effected by analyzing $H_2$ component in gas in a blast furnace, judging from flame color of $H_2$ by igniting the furnace gas taken out from the furnace wall, or taking out the furnace gas from the leaked portion while moving a pair of slidable packings provided in the inner portion of the cooling pipe.

(4) The detecting is effected by inspecting admixture of CO gas in the discharged cooling water by means of naked eyes or by gatherning in a container.

(5) The detecting is effected by measuring CO gas or $CO_2$ gas component admixed in the cooling water by changing over and collecting the cooling water at every system and mixing with air or $N_2$ gas in a water separating vessel.

(6) The detecting is effected by inspecting CO gas mixed and discharged in bubble form in the discharged cooling water by means of a gas detecting means.

Among the above described detecting processes, the detecting process owing to the difference of the water flow rate between the inlet side and the outlet side in the above described process (1) is most highly reliable but it is difficult to detect the slight leakage at the initial stage of leakage and in a large number of installations of cooling water system, the apparatus becomes an extremely large scale.

Concerning the above described processes (2) and (3), there is problem in the detecting ability, the practice is difficult and the maintenance of the detecting device should be considered, so that these processes are not practical.

The above described processes (4) and (5) are comparatively practically carried out but the process (4) needs time and labor until the detection and is difficult in the detection of fine breakage and in the automation of the detection.

The process (5) is possible in the automatic detection and has merits but there is problem in the gas to be mixed and the constant amount of the water separator and the signal/noise ratio in detection of fine breakage at the original stage of the cooling water is worse and the detecting sensitivity is low and if the sensitivity is improved, the erroneous detection would frequently occur. Concerning the above described process (6), there is neither description of the practical process nor practical embodiment, so that evaluation cannot be made.

Generally speaking, the process capable of detecting comparatively fine breakage is to detect the gas component in the discharged cooling water, which is commonly disclosed in the processes (4)–(6), but the mixed gas is analyzed directly, so that the high reproducibility cannot be obtained. When a part where bubbles are present, is taken up, the gas content ratio is extremely high and the difference comparing with the case where the part containing no bubble is taken up, is noticeable.

The present invention does not measure CO amount present in the discharged cooling water as bubbles but measures the dissolved CO amount. The analysis of bubbles in the discharged cooling water as in the prior processes is to measure an amount of free gas exceeding the solubility, and then the sensitivity and quickness are inferior to those in the case of the measurement of the dissolved amount. That is, when breakage occurs in the stave, the cooling water flows into the furnace and the furnace gas mixes in the cooling water and in this case, the gas dissolves in the cooling water up to the amount which is regulated by Henry's law and when the breakage is large and an amount of the gas admixed becomes larger, the gas becomes bubble and is separated from water. The present invention intends to measure the concentration of CO gas at the stage where CO gas is dissolved at the initial stage when the breakage of the cooling water pipe is still fine and provides a method and an apparatus for detecting the leakage of the cooling water, which is different from the prior process measuring the separated gas bubbles and is excellent in the sensitivity, responsibility and reproducibility.

The present invention consists in a method for detecting water leaked into an equipment keeping a large amount of CO gas due to breakage of means for cooling said equipment, in which an amount of CO dissolved in the discharged cooling water is quantitatively analyzed and the variation of the amount of CO dissolved is inspected.

An apparatus for carrying out the above described method of the present invention comprises a sampling device for taking up a sample water from the discharged cooling water, and a device for analyzing CO provided with a metering device for taking up a given amount of sample for measuring an amount of CO dissolved from the sample water and a degassing chamber for degassing CO gas dissolved in the given amount of sample.

The present invention will be explained with respect to a cooling means in an apparatus keeping a large amount of CO gas therein, for example staves of a blast furnace. An inner pressure in the blast furnace during the usual operation is about 3-4 kg/cm² and is substantially equal to the pressure of the cooling water. Therefore, when the cooling means of staves and the like is broken and water leaks into the furnace, the furance gas admixes in the cooling water in return for the leaked water and is dissolved to the amount regulated by temperature and pressure.

TABLE 1

|     |                      | (Volume ratio)           |                      |
| --- | -------------------- | ------------------------ | -------------------- |
|     |                      | CO                       | $CO_2$               |
| (1) | Solubility in water  | $2.3 \times 10^{-2}$ at 20° C. | $8.8 \times 10^{-1}$ |
| (2) | Component in air     | $10^{-5}$                | $3 \times 10^{-3}$   |
| (3) | Component in furnace | 0.2-0.4                  | 0.1-0.2              |

In Table 1, (1) shows the solubility of CO and $CO_2$ in water, (2) shows ratio of CO and $CO_2$ contained in air, and (3) shows the content ratio of CO and $CO_2$ in the blast furnace gas.

Within the range wherein an amount of the cooling water leaked is small, the total amount of gas mixed in the cooling water is dissolved and each amount of CO and $CO_2$ dissolved up to the product of the solubility of each gas and the partial pressure following to Henry's law. That is, the product of the value (3) and the value (1) in Table 1 is the maximum amount of the gas dissolved in the cooling water and in an amount less than said amount, if the cooling water flow rate is constant, the dissolved amount is in proportion to the flow rate of the furnace gas mixed. This dissolved amount, as far as the cooling water does not encounter other gas, is constant and therefore it is possible to judge whether the leakage occures or not and the degree of the breakage by measuring this value.

FIG. 1 is a graph obtained by comparing an amount of CO injected into cooling water with the dissolved amount when CO gas is imitatively injected into the cooling water and it can be seen that both the amounts are in the proportional relation.

Water when the cooling water is not leaked, may be considered to be that water contacts with only air and the maximum dissolved amount is the product of the value (2) and the value (1) in Table 1.

When it is detected whether the cooling water leaks or not, as the difference of the dissolved gas amount when the cooling water leaks from that when the cooling water does not leak, is larger, the fear of the erroneous measurement is few, so that (3)/(2) in Table 1 becomes the evaluation index. That is
Case of CO component: $0.2-0.4 \times 10^5$
Case of $CO_2$ component: $0.3-0.7 \times 10^2$.

This shows that the measurement of the amount of CO dissolved is far more advantageous than that of the amount of $CO_2$ dissolved.

TABLE 2

|     |                                      | Measured value of dissolved CO amount (mass ratio) | Remarks                |
| --- | ------------------------------------ | -------------------------------------------------- | ---------------------- |
| (1) | A blast furnace stave cooling water  | 10 ppb                                             |                        |
| (2) | B blast furnace stave cooling water  | 8 ppb                                              |                        |
| (3) | A blast furnace stave cooling water  | Initial stage of leakage 40-100 ppb                | Leaking start in stave |

TABLE 2-continued

|     |                                       | Measured value of dissolved CO amount (mass ratio) |                      | Remarks                                                                     |
| --- | ------------------------------------- | -------------------------------------------------- | -------------------- | --------------------------------------------------------------------------- |
|     |                                       | Last stage of leakage                              | more than 200 ppb    |                                                                             |
| (4) | B blast furnace machine cooling water | 200 ppb                                            |                      | There is breakage at contact portion with blast frnace gas in the system    |
| (5) | City water                            | 2-3 ppb                                            |                      |                                                                             |
| (6) | City water after purging with $N_2$ gas | 0 ppb                                            |                      |                                                                             |

Table 2 shows the results obtained by measuring various waters and (1) and (2) are cooling water of staves not broken, (5) and (6) are city water and (3) and (4) are cooling water when breakage has occurred. From the comparison of the above data in Table 2, it has been confirmed that the detecting ability of the broken portions by measuring the dissolved CO amount is satisfactory.

It has been found according to the inventor's experiment that in the process for detecting the breakage of stave by measuring the amount of CO dissolved according to the present invention, the breakage in the staves has been already found about 60 hours before the operator discovers bubbles in the discharged cooling water by naked eyes and finds the breakage of the staves.

The present invention will be explained in more detail.

For better understanding of the invention, reference is taken to the accompanying drawings, wherein.

Figure 2:
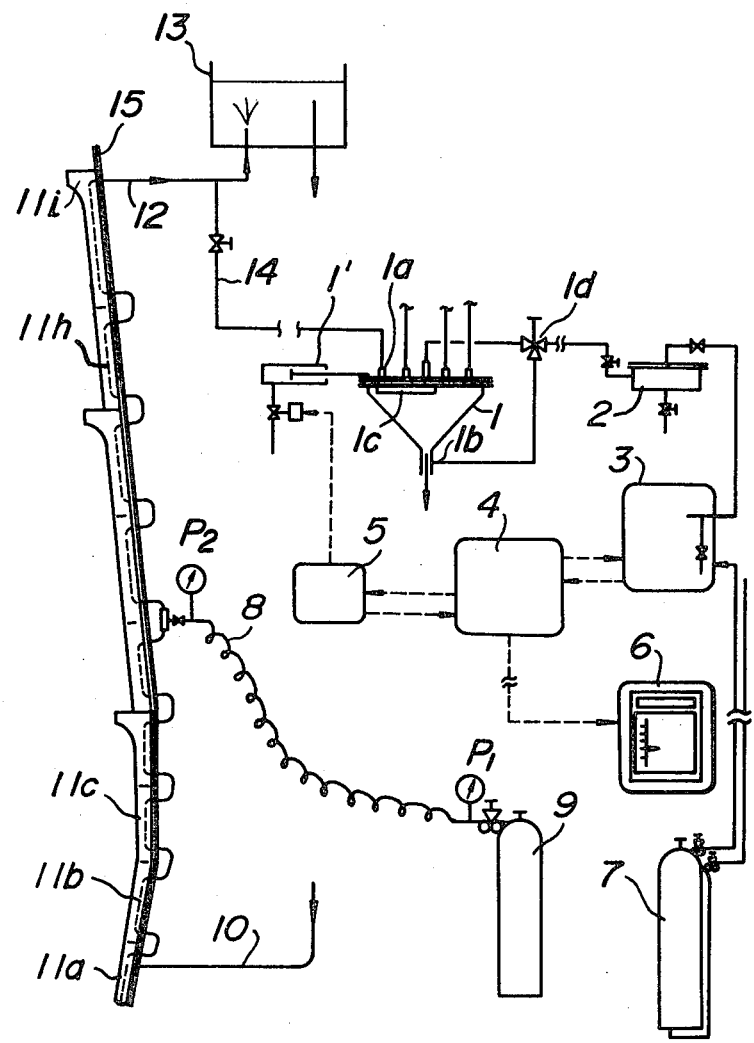
FIG. 2 is a diagrammatical view for showing one embodiment of apparatus for carrying out the detecting method of the present invention.

FIG. 2 shows an embodiment of construction of an apparatus for detecting the breakage in the staves. A numeral 15 is a blast furnace, numerals 11a-11i are staves, a numeral 10 is a pipe for feeding cooling water from a header (not shown), a numeral 12 is a pipe for discharging the cooling water and a numeral 13 is a discharged cooling water trough.

A part of the discharged cooling water is taken out by a sampling pipe 14 from the pipe 12 and is fed to a filter 2 by means of a scanner 1 which changes over the flow passage of the discharged cooling water. For the scanner, an apparatus for changing over the discharged cooling water pipe for detecting breakage of cooling pipes in a blast furnace disclosed in Japanese Utility Model Application No. 84,059/78 is most preferably and was used in the Example in the present invention. The sampling water is passed through the filter 2, for taking up or separating a given amount of water therefrom, and the amount of CO dissolved in the separated or metered sample water is measured by a dissolved CO meter 3 and the measured value is recorded and displayed in a recorder 6.

The scanner 1 and a controller 4 for the dissolved CO meter 3 are controlled by a sequence control device 5 to synchronize the changing over of the flow passages with the measurement of the amount of CO dissolved, and the sampling position and the measured value are recorded on a recorder 6.

A numeral 7 is carrier gas bombs for $N_2$ and $H_2$ necessary for analysis and a numeral 9 is a bomb for standard gas of about 27% of CO for checking whether the entire apparatus operates correctly or not. By controlling the pressure difference of the inlet and outlet of a capillary (1/16") 8, it is possible to dissolve a given flow rate of CO gas in the way of a stave and to check whether the correct indication appears at the flow passage or not.

The scanner 1 can change the function by a three way valve 1d. Namely, usually the flow passage of 1a side is connected to the downstream side and the sampling is changed over by action of 1c but by changing the flow direction in the valve 1d, the flow passage of 1b side is connected to the downstream side. In this case, a sampling of the average of the flow passages other than the flow passage selected by 1c is carried out.

Figure 3:
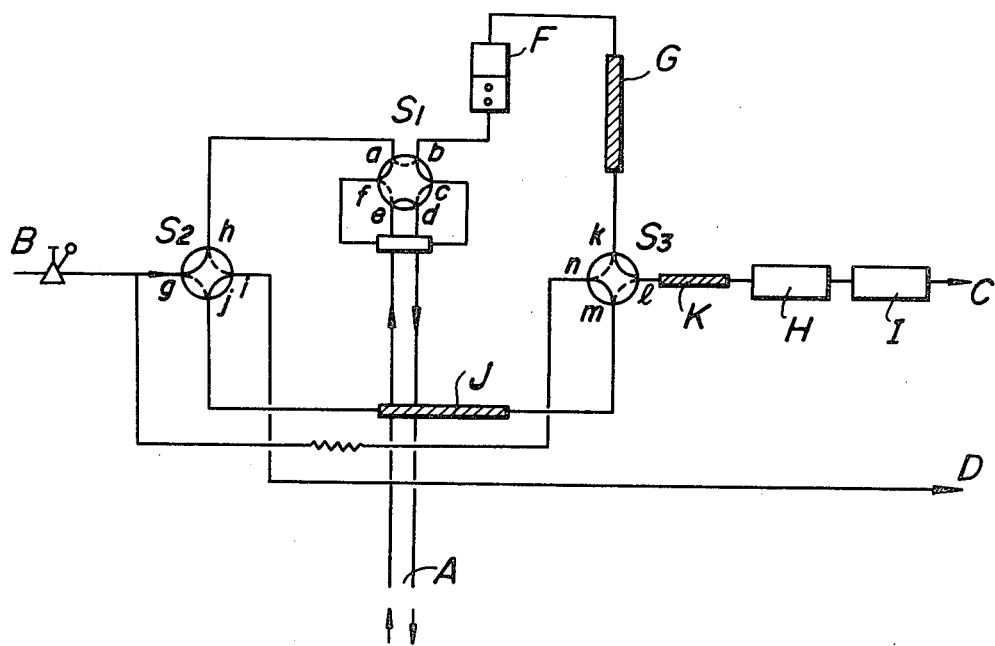
FIG. 3 is a diagrammatical view for explaining a dissolved CO meter.

Then, one embodiment of function of an analyzer 3 for the dissolved CO gas will be explained hereinafter. FIG. 3 is a diagram for explaining priciple of the dissolved CO meter. A shows a sample water which is a part of the discharged cooling water taken up and usually said water is discharged in circulation of e→f→metering tube E→c→d by forming the flow passage of the dotted line by means of a sampling valve $S_1$.

When the sampling valve $S_1$ is changed over so as to form the flow passage shown by the solid line by the signal from the control device 4, the carrier gas flows through B→g→h→a→f→metering tube E→c→b to feed a given amount of the sample water stored in the metering tube E into a degassing chamber F. Since the degassing chamber F has a sufficiently larger capacity than the piping, the pressure of the sample water is rapidly reduced and CO dissolved in the sample water is completely purged by the carrier gas and fed into a column G. The construction following to the column G is completely same as the usual gas chromatography and in this column, CO component and $CO_2$ component are completely separated owing to the difference of the transfer speed in the column and only CO component is fed into methane converter H and FID detecter I, in which CO component is quantitatively analyzed. When CO component passes through the column K, the column changing valves $S_1$, $S_2$ and $S_3$ are changed over the carrier gas flows through B→n→k→column G→degassing chamber F→b→a→h→i→vent D and the water to be measured and gas are completely removed out of the system. The operation and function of the column changing valves $S_2$ and $S_3$, the columns G, J and K, the methane converter H and FID detector I are same as the usual gas chromatograph, so that the explanation concerning these devices is omitted.

Figure 1:
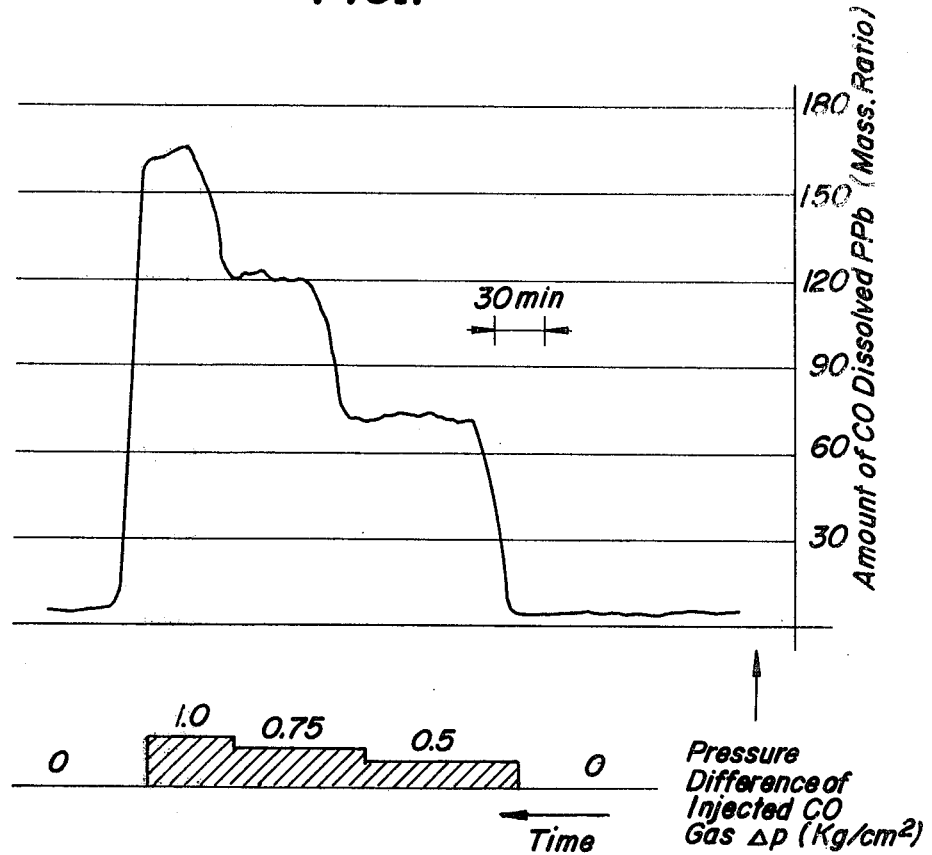
FIG. 1 is a graph showing a relation of an amount of CO gas injected to an amount of CO dissolved.

The dissolved CO meter used in the present invention is characterized in that the sample water is taken up in a given amount by the metering tube and the degassing is completely carried out in the degassing chamber. Accordingly, the quantitative analysis having a high reproducibility is feasible. FIG. 1 shows an example of the test result and the pressure difference ($\Delta P = P_1 - P_2$) between the inlet and the outlet of the capillary shown in FIG. 2 is adjusted in three stages to imitatively vary the amount of CO dissolved and said amount is analyzed by the measuring apparatus according to the present invention. As the result, it is shown by the variation of the amount of CO dissolved in FIG. 1 that there is a proportional relation between the pressure difference of the charged CO gas and the amount of CO dissolved.

An explanation will be made with respect to an example wherein the breakage of the stave was detected by using the method and apparatus of the present invention.

EXAMPLE

Figure 5:
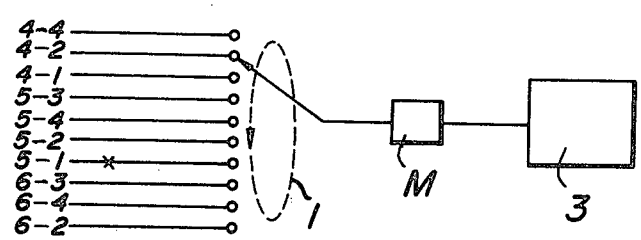
FIG. 5 is an explanatory view of Example recorded in FIG. 4.
Figure 4:
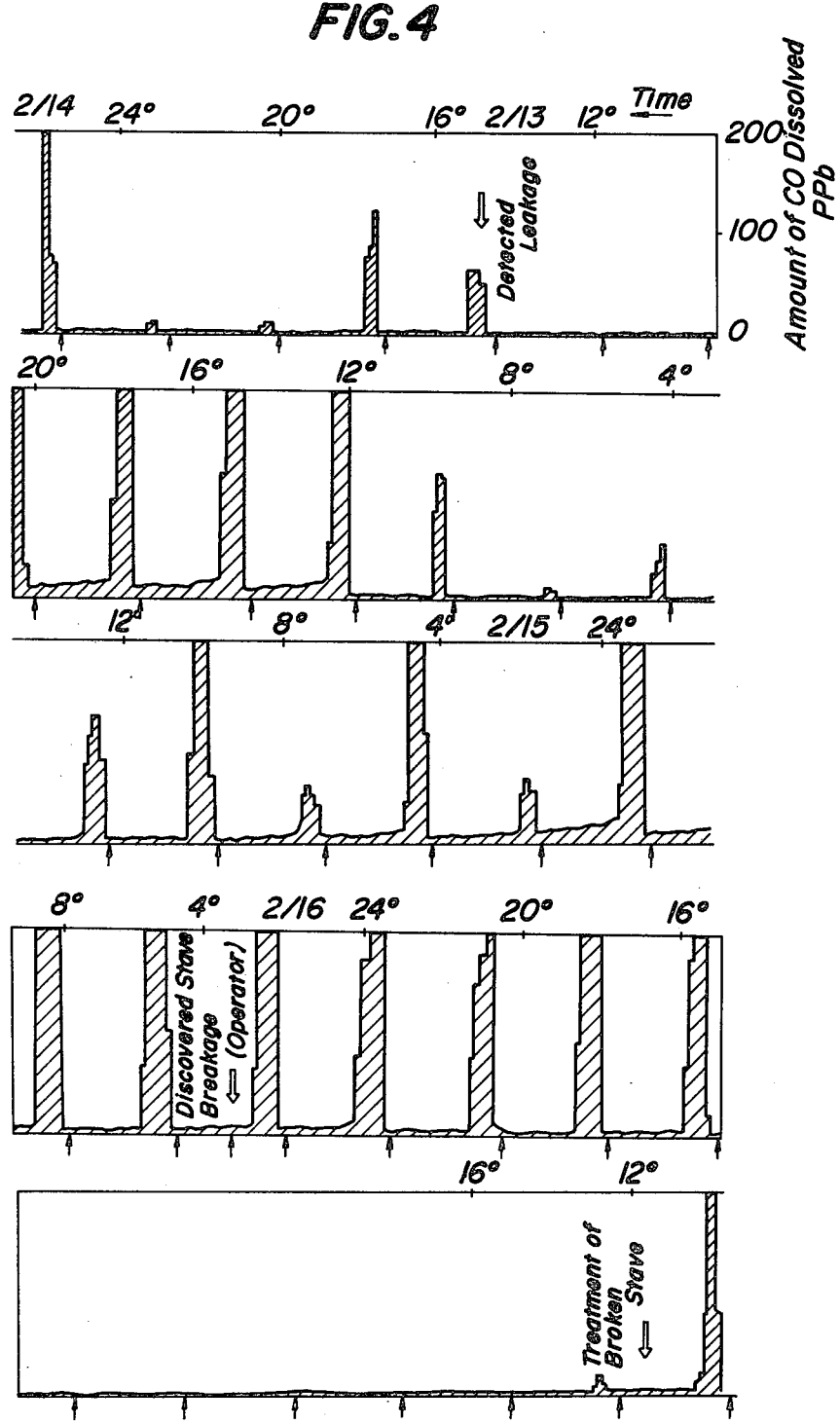
FIG. 4 is a diagram of a record showing the variation of the amount of CO gas dissolved when stave is broken.

An apparatus of the present invention was applied to staves of a blast furnace during operation as in the explanatory view of FIG. 5 and a record when one flow passage in ten flow passages in which the dissolved CO is being measured, was in actual broken, is shown in FIG. 4. In FIG. 4, the point of the upward arrow on the time axis shows the time when the stave is sampled by the scanner 1 and it can be shown that the amount of CO dissolved increased at about 15 o'clock, 13th, February. Thereafter, the amount of CO dissolved increased and reduced repeatedly and on and after 16 o'clock, 15th, February the record shows always more than 200 ppb and it is considered that the breakage of the stave advanced. At 3 o'clock, 16th, February, an operator found breakage of the stave and the stave was treated at 12 o'clock of the same day, so tht the record shows that the amount of CO dissolved reduced quickly. In this example, the detecting apparatus according to the present invention found the breakage of the stave about 60 hours before the operator found the breakage and this apparently shows the effectiveness of the apparatus of the present invention.

The above described Table 2 shows the measured results obtained by applying the apparatus according to the present invention to various cooling waters and it is shown as mentioned above that the gas in the discharged cooling water in (3) and (4) wherein the equipments are broken and the cooling water leaks, can be highly sensitively detected.

The process and apparatus of the present invention concern cooling means which contacts with CO gas, such as tuyere and stave of a blast furance and the like, and are applicable for all the means when the pressure in the furnace gas is not considerably lower than the pressure of the cooling water and the reproducibility, sensitivity, signal/noise ratio are excellent and the installation is simple. In addition, the sensitivity is higher, so than even if a plurality of cooling water flow passages are together collectively measured, the satisfactory detecting ability is obtained. Accordingly, a plurality of cooling water flow passages are usually monitored together collectively and when an abnormal indication appears, CO amount is measured with respect to the respective flow passage by switching a scanner and only the flow passage wherein the breakage occures, is treated. Thus, the present invention is far more excellent than the prior detecting processes and apparatus.

What is claimed is:

1. A method for detecting leakage of cooling water in equipment keeping a large amount of CO gas therein, which method comprises, taking up part of the cooling water discharged by said equipment as sample water, feeding the sample water into a metering tube for separating a predetermined amount of water thereof, feeding the metered sample water into a degassing chamber to separate CO gas and $CO_2$ gas dissolved therein, from water, quantitatively analyzing the CO gas by means of a gas chromatograph to record the measured CO amount, and inspecting the variation of the amount of CO gas dissolved in the discharged cooling water.

2. An apparatus for detecting leakage of cooling water in equipment keeping a large amount of CO gas therein, which apparatus comprises, sampling means for taking up a sample of water of the cooling water discharged by said equipment, a metering tube connected to said sampling means for separating a predetermined amount of water from the sample water, a degassing chamber for separating CO gas and $CO_2$ gas, dissolved in the metered sample water, from water, a gas analyzing device located downstream of said degassing chamber for quantitatively analyzing the CO gas separated from the metered sample water, and recording and display means connected to said gas analyzing device for recording and showing the measured CO amount.

* * * * *